(12) United States Patent
Wu

(10) Patent No.: US 11,469,042 B2
(45) Date of Patent: Oct. 11, 2022

(54) PUNCHING PROCESS FOR MANUFACTURE OF WIRELESS CHARGING COILS AND MANUFACTURE METHOD FOR WIRELESS CHARGING COILS

(71) Applicant: HOLYGO CORPORATION, Taipei (TW)

(72) Inventor: Chien-Te Wu, Taipei (TW)

(73) Assignee: HOLYGO CORPORATION, Taipei (TW)

( * ) Notice: Subject to any disclaimer, the term of this patent is extended or adjusted under 35 U.S.C. 154(b) by 373 days.

(21) Appl. No.: 16/269,476

(22) Filed: Feb. 6, 2019

(65) Prior Publication Data

US 2019/0252118 A1   Aug. 15, 2019

(30) Foreign Application Priority Data

Feb. 9, 2018  (TW) ................. 107104666

(51) Int. Cl.
| H01F 7/06 | (2006.01) |
| H01F 41/12 | (2006.01) |
| H02J 7/02 | (2016.01) |
| H02J 50/10 | (2016.01) |

(52) U.S. Cl.
CPC .............. *H01F 41/12* (2013.01); *H02J 7/025* (2013.01); *H02J 50/10* (2016.02)

(58) Field of Classification Search
CPC .......... H02J 50/10; H02J 7/025; H01F 41/04; H01F 41/12; H01F 5/00; H01F 27/2847
See application file for complete search history.

(56) References Cited

U.S. PATENT DOCUMENTS

| 6,630,370 | B2 * | 10/2003 | Kasahara ......... G06K 19/07749 |
| | | | 257/679 |
| D510,103 | S * | 9/2005 | Allard et al. |
| 10,201,844 | B2 * | 2/2019 | Nishinaka ................ B05D 1/26 |
| 2019/0228902 | A1 * | 7/2019 | Wu ............................ H01F 5/00 |
| 2020/0335272 | A1 * | 10/2020 | Wang ...................... H02J 50/10 |

* cited by examiner

*Primary Examiner* — Paul D Kim
(74) *Attorney, Agent, or Firm* — Maschoff Brennan

(57) ABSTRACT

A punching process for wireless charging coils comprises: punching a metal piece for forming a coil structure and a fixing element, the coiling structure having a plurality of coil segments, a gap being between two of the plurality of coil segments, and the fixing element connecting the coil segments for keeping the width of the gap.

6 Claims, 11 Drawing Sheets

PUNCHING PROCESS FOR MANUFACTURE OF WIRELESS CHARGING COILS AND MANUFACTURE METHOD FOR WIRELESS CHARGING COILS

CROSS-REFERENCE TO RELATED APPLICATIONS

This non-provisional application claims priority under 35 U.S.C. § 119(a) on Patent Application No(s). 107104666 filed in Taiwan, R.O.C. on Feb. 9, 2018, the entire contents of which are hereby incorporated by reference.

BACKGROUND

1. Technical Field

The disclosure relates to a manufacture method of circuit, more particularly to the manufacture method for the wireless charging coils.

2. Related Art

For the reason of avoiding using the additional specification charger for the portable electronic devices, there are more and more portable electronic devices configured with wireless charging coils and batteries. The wireless charging coils are able to transmit the power and supply the electric energy to the batteries by magnetic induction or magnetic resonance. A wireless charging coil comprises a plurality of coil segments next to each other, wherein there is a gap defined by two coil segments next to each other. As the gap is narrow for the same area, the width of the wire diameter is relatively wide; hence, the wireless charging coil comprises preferable conductivity.

However, it must need to keep the same width of the gaps which are between two coil segments next to each other in order to maintain the quality of the wireless charging coil. If the widths of the gaps are different from each other, it probability makes the wireless charging coil stop working due to the short circuit on the coil segments.

The present manufacture method of the wireless charging coil comprises the winding method and the photo etching method. Although the winding method is able to keep the same width of the gaps defined by the coil segments, the defect is not adapted for being disposed in the portable electronic device since to the whole thickness of the wireless charging coil is too thick.

The photo etching method connects a copper piece to a substrate firstly, and produces the drawing of the wireless charging coil through reticle and etching. Although the photo etching method are able to keep the same width of the gaps between the coil segments, the defect is the expensive cost, high electric consumption during the production process, producing slowly and causing the environmental pollution.

Hence, for the reason of improving the above defects at least, it needs a manufacture method of the wireless charging coils presently.

SUMMARY

According to an embodiment in this disclosure, a method of the punching process for wireless charging coils is disclosed, which comprises: punching a metal piece for forming a coil structure and a fixing element, wherein the coiling structure comprises a plurality of coil segments, a gap is defined by two of the plurality of coil segments, and the fixing element connects to the two coil segments for keeping a width of the gap.

According to an embodiment in this disclosure, a manufacture method for wireless charging coils is disclosed, which comprises: performing a first punching process to a metal piece to form a punched metal piece, with the punched metal piece comprising a coil structure and a fixing element. The coil structure comprises a plurality of coil segments, two coil segments of the plurality of coil segments defining a first gap, and the first gap having an extended direction. The first gap comprises an extended direction, wherein the fixing element connects to the two coil segments to keep a width of the first gap. Pasting a transferring film on the punched metal piece, wherein the transferring film connects to the two coil segments for keeping the width of the first gap. Also, a second punching process is performed to the punched metal piece pasted with the transferring film for removing parts of the fixing element corresponding to the extended direction of the first gap.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 4 is the floor plan which the coil structures connect to the fixing element in the first embodiment of.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
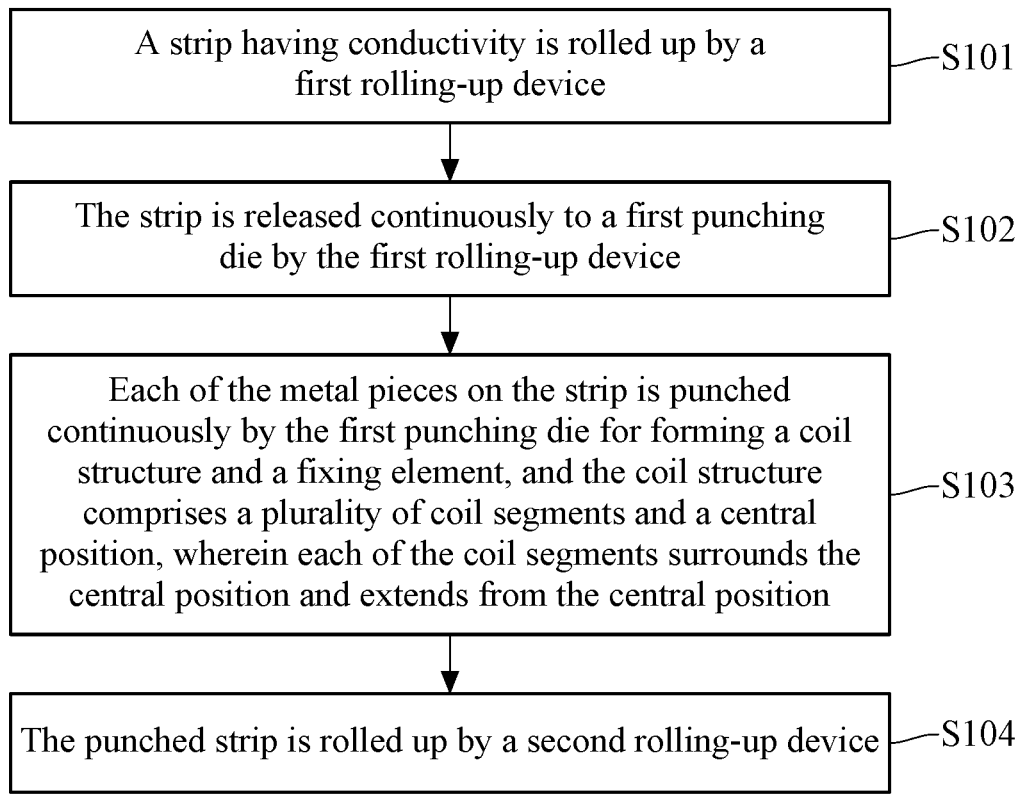
FIG. 1 is the flowchart of the punching process for the wireless charging coils in an embodiment of this present disclosure.

Please refer to FIG. 1 which is the flowchart in an embodiment of the punching process for the wireless charging coils of this present disclosure. As FIG. 1 shows, the steps of the punching process for the wireless charging coils are described as follows. In the step S101, a strip having conductivity is rolled up by the first rolling-up device, wherein the strip comprises a plurality of metal pieces which connect to each other. The material of the strip is copper in this embodiment, but the material is also able to be other conductive materials in other embodiments. In the step S102, the strip is released continuously to the first punching die by the first rolling-up device. In the step S103, each of the metal pieces on the strip is punched continuously by the first punching die for forming and a coil structure and a fixing element. Moreover, the coil structure comprises a plurality of coil segments and a central position, wherein each of the coil segments surrounds the central position and extends from the central position (for example, each of the coil segments surrounds the central position for 360 degrees). Also, there is a gap defined by two of the coil segments, and the gap comprises an extended direction; additionally, parts of the fixing element are corresponding to the extended direction, wherein the fixing element connects to the two coil segments. Hence, the width of the gap defined by the two coil segments is able to be kept by the fixing element. In this embodiment, the coil segments comprise the same wire diameter, and the gap comprises the same and uniform width; hence, the quality of coil structure is able to be maintained. However, in other embodiments, this kind of the width designed is not necessary. The fixing element connects to the two coil segments for keeping the width of the gap defined by the two coil segments. In the step S104, a punched strip is rolled up by a second rolling-up device. Because some small pieces of the copper are usually remained on the punched strip, the remained copper pieces are able to be removed from the strip by the acid cleaning or the ultrasound after the punched strip is released by the rolling-up device. As the small pieces of copper are removed from the strip, it is workable to plate Tin (Sn) or other antioxidant materials on the strip for making the strip be antioxidant.

The two coil segments of the coil structures are able to be connected to each other by the fixing element, so the width of the gap defined by the two coil segments are not changed by the force which is pulled by the rolling-up device. Hence, the quality of the coil structure is able to be maintained.

Figure 2:
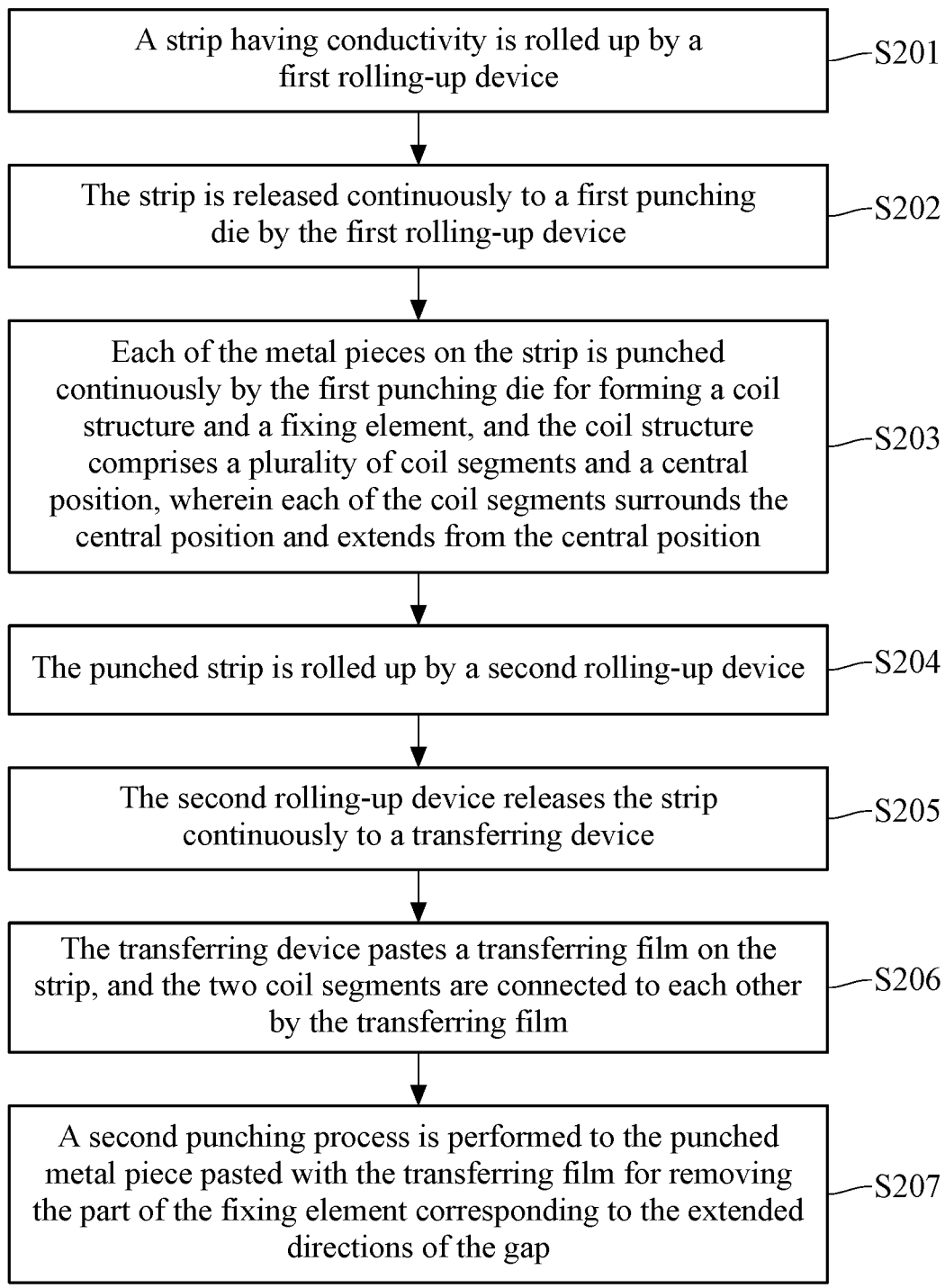
FIG. 2 is the flowchart of the manufacture method for the wireless charging coils in an embodiment of this present disclosure.

Please refer to FIG. 1 and FIG. 2, and FIG. 2 is the flowchart of the manufacture method of the wireless charging coils in an embodiment of this present disclosure. As FIG. 2 shows, the steps of the manufacture method for the wireless charging coils are described as follows: the steps S201 to S204 are similar to the steps S101 to S104 in FIG. 1, and the major difference is in that the manufacture method in FIG. 2 comprises two times punching processes. Hence, a first punching process is performed to the metal pieces are emphasized in the steps S203 and S204. In the step S205, the second rolling-up device releases the strip continuously to a transferring device. In the step S206, the transferring device pastes a transferring film on the strip, and the two coil segments are connected to each other by the transferring film. hence, the width of the gap defined by the two coil segments is able to be kept. For the purpose of pasting the transferring film smoothly on the strips, there is a rolling and pressing device to roll and press the strip pasted with the transferring film on. In the step S207, a second punching process is performed to the punched metal piece pasted with the transferring film for removing the parts of the fixing element corresponding to the extended directions of the gap. In other embodiment, the transferring device pastes the transferring films on the punched strips after the strips are punched for the first time, so the second rolling-up device is not necessary to set.

Because the two coil segments are connected to each other through the transferring film, the width of the gap defined by the two coil segments does not change during the second punching process; hence, the quality of the coil structure is able to be maintained.

Figure 3:
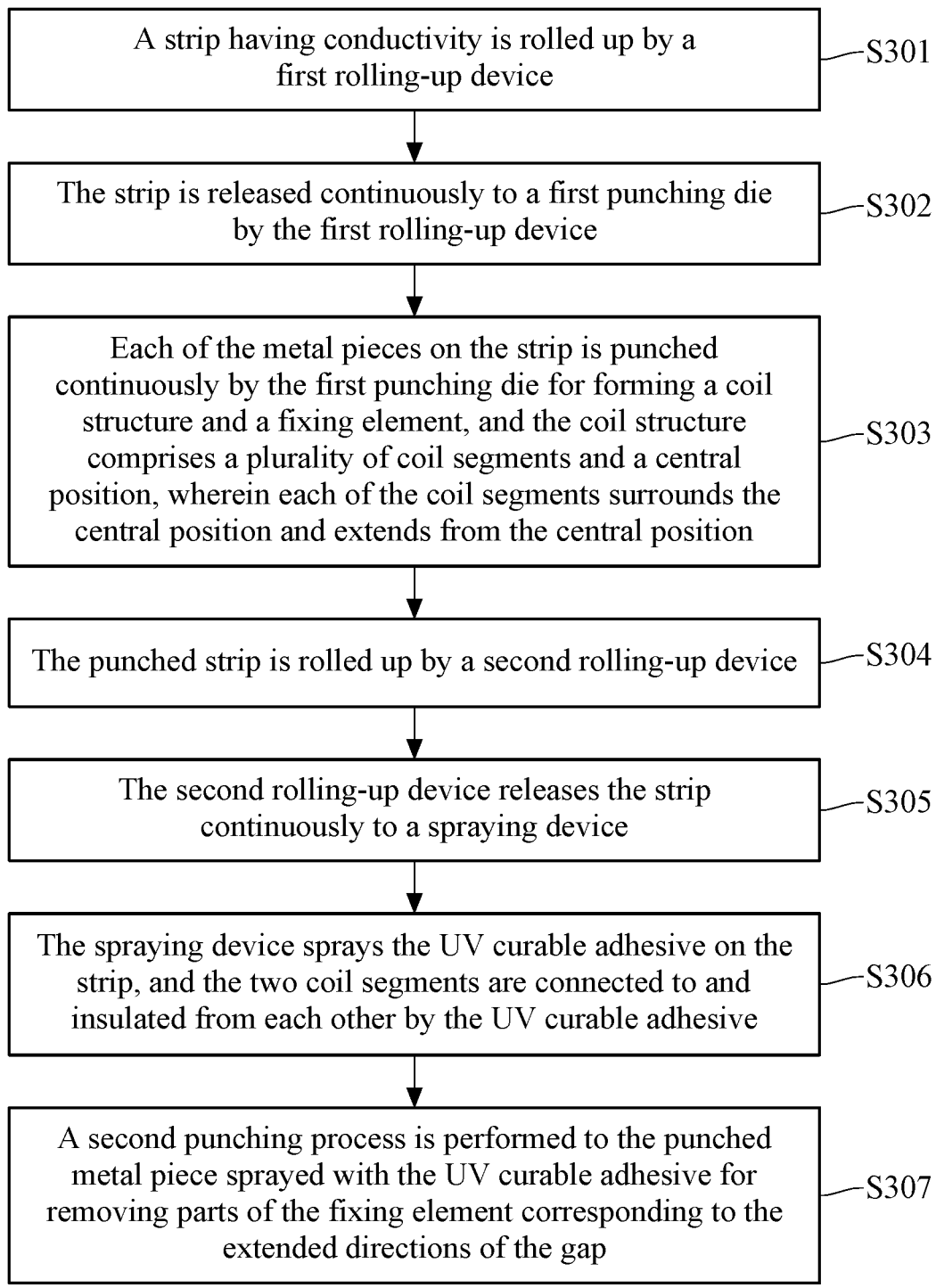
FIG. 3 is the flowchart of manufacture method for the wireless charging coils in another embodiment of this present disclosure.

Please refer to FIG. 2 and FIG. 3, which are the flowchart of the manufacture method of the wireless charging coils in another embodiment in this present disclosure. As FIG. 3 shows, the steps of the manufacture method for the wireless charging coils are described as follows. The steps S301 to S304 are similar to the steps S201 to S204 in FIG. 2, and the difference from the manufacture method in FIG. 3 is that an UV (ultraviolet) curable adhesive layer replaces the transferring film. In the step S305, the second rolling-up device releases the strips continuously to a spraying device. In the step S306, the spraying device sprays the UV (ultraviolet) curable adhesive on the strip, and the two coil segments are connected to and insulated from each other by the UV (ultraviolet) curable adhesive. Hence, the width of the gap defined by the two coil segments is able to be kept. In the step S307, a second punching process is performed to the punched metal piece sprayed with the UV (ultraviolet) curable adhesive for removing parts of the fixing element corresponding to the extended directions of the gap. It is worth mentioning that, spraying the UV (ultraviolet) curable adhesive is not only keeps the width of the gap defined by the two coil segments, but also comprises an anti-corrosive function. Thus, it is not necessary to plate Tin (Sn) or other antioxidant materials on the strip through spraying the UV (ultraviolet) curable adhesive.

Figure 4:
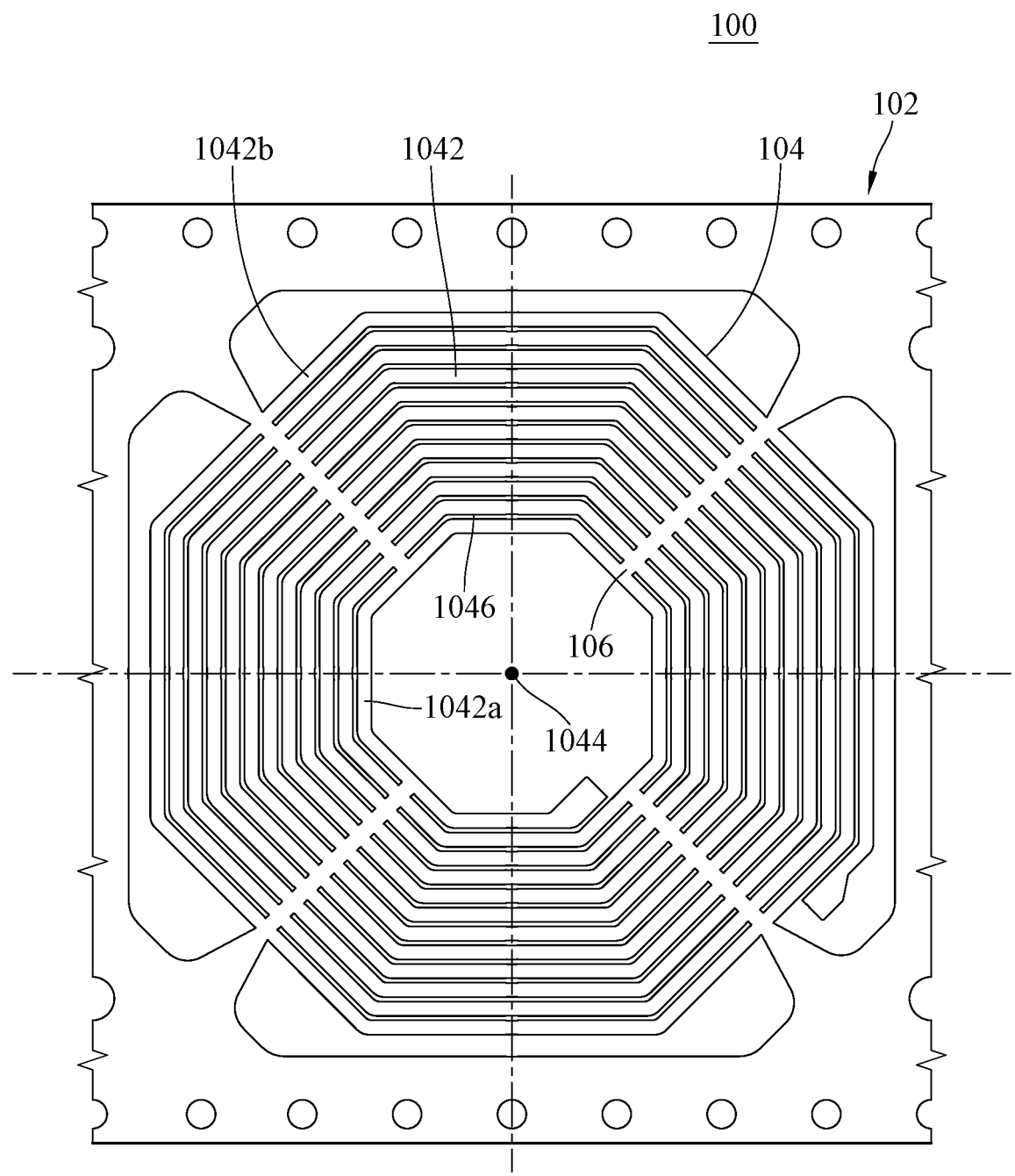

Please refer from FIG. 1 to FIG. 4 together. FIG. 4 is the floor plan of the coil structure connected to the fixing element in the first embodiment of this disclosure. As FIG. 4 shows, after the punching device performs the first punching process to each of the mental pieces on the strip 100, each of the metal pieces on the strip 100 comprises a coil structure 104 and a plurality of fixing elements 106. In addition, the coil structure 104 comprises a plurality of coil segments 1042 and a central position 1044, and each coil segment 1042 surrounds and extends from the central position 1044. Also, the coil segment 1042 comprises a plurality of bending portions. In addition, there is a gap 1046 defined by any two coil segments 1042 next to each other, and the coil segments 1042 comprise a first coil segment 1042a and a second coil segment 1042b. Furthermore, the first coil segment 1042a is the one nearest to the central position of all the coil segments 1042, and the second coil segment 1042b is the one farthest from the central position of all coil segments 1042. Moreover, the fixing element 106 connects to all the coil segments 1042 disposed between the first coil segment 1042a and the second coil segment 1042b. Each gap 1046 comprises an extended direction, and each of the fixing elements 106 comprises parts corresponding to the extended direction of the gap 1046. In this embodiment, each of the fixing elements 106 extends in two extended directions, and the angle between the two extended directions of the fixing elements 106 intersected to each other is 90 degrees, and the two extended directions of the fixing elements 106 are intersected to the central position 1044 of the coil structures 104.

In this embodiment, the first punching die comprises a plurality of continuous dies, wherein the first punching die includes the punched metal piece. Also, the first punching die further comprises a plurality of continuous punching sections for forming the coil structures 104 and each of the fixing elements 106. Hence, the coil structures 104 and the fixing elements 106 are both formed by the staged punching rather than the once punching. The number of the punching section is determined by the first punching die. Moreover, the staged punching is able to avoid forming the stressing indentation on the metal pieces 102, if there is a stressing indentation on the metal piece 102, aforementioned metal piece 102 will be wrapped due to the hot and cold rinse.

Figure 5:
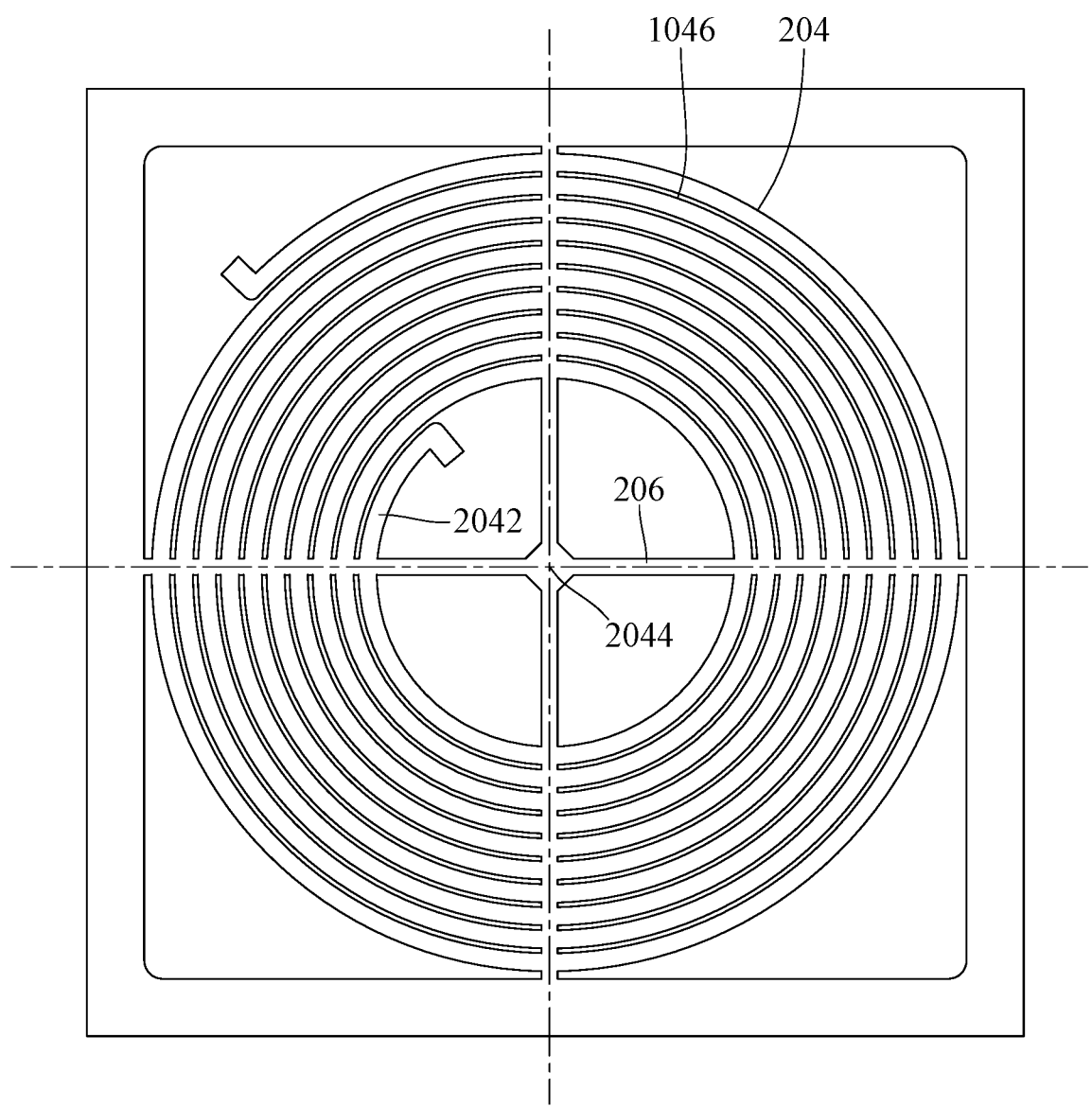
FIG. 5 is the floor plan which the coil structures connect to the fixing elements in the second embodiment of this present disclosure.

Please refer to FIG. 5. FIG. 5 is the floor plan which the coil structure is connected to the fixing element in the second embodiment of this disclosure. As FIG. 5 shows, the major difference between the third embodiment and the first embodiment shown in FIG. 1 is that this embodiment comprises a coil structure 204 and a cross fixing elements 206, wherein the coil structure 204 comprises a plurality of curved coil segments 2042 and a central position 2044. Moreover, each of the coil segments 2042 surrounds and extends from the position 2044. The fixing elements 206 connect to the coil segments 2042, and the extended directions of the fixing elements 206 are intersected to the central position 2044 of the coil structures 204.

Figure 6:
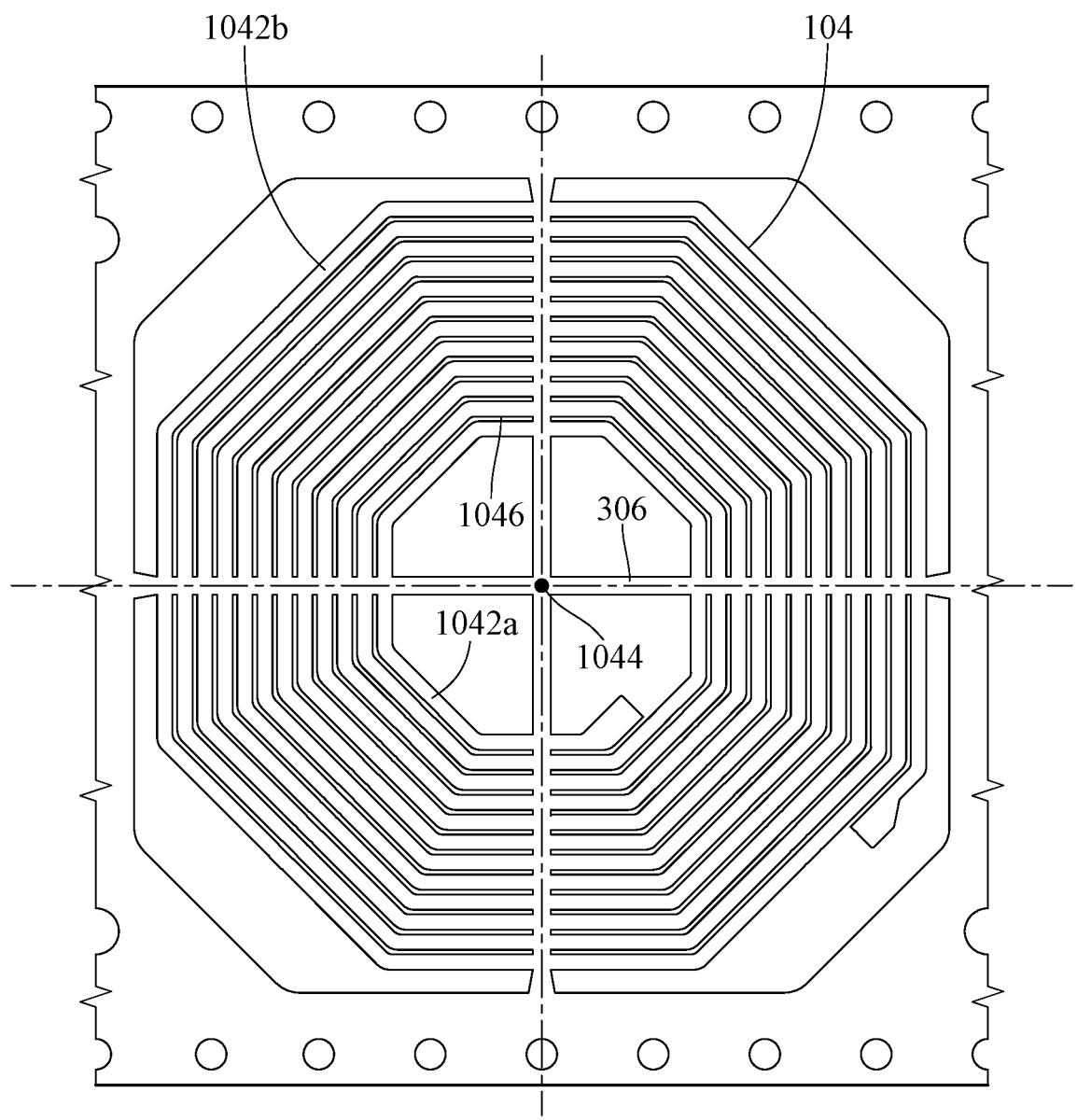
FIG. 6 is the floor plan which the coil structures connect to the fixing elements in the third embodiment of this present disclosure.

Please refer to FIG. 6. FIG. 6 is the floor plan which the coil structure is connected to the fixing elements in the third embodiment. As FIG. 6 shows, the major difference between the third embodiment and the first embodiment shown in FIG. 1 is that this embodiment comprises a cross fixing elements 306, wherein the fixing elements 306 connect to the coil segments 1042. Also, the coil segments 1042 and the extended directions of the fixing elements 306 are intersected to the central position 3044 of the coil structures 304.

Figure 7:
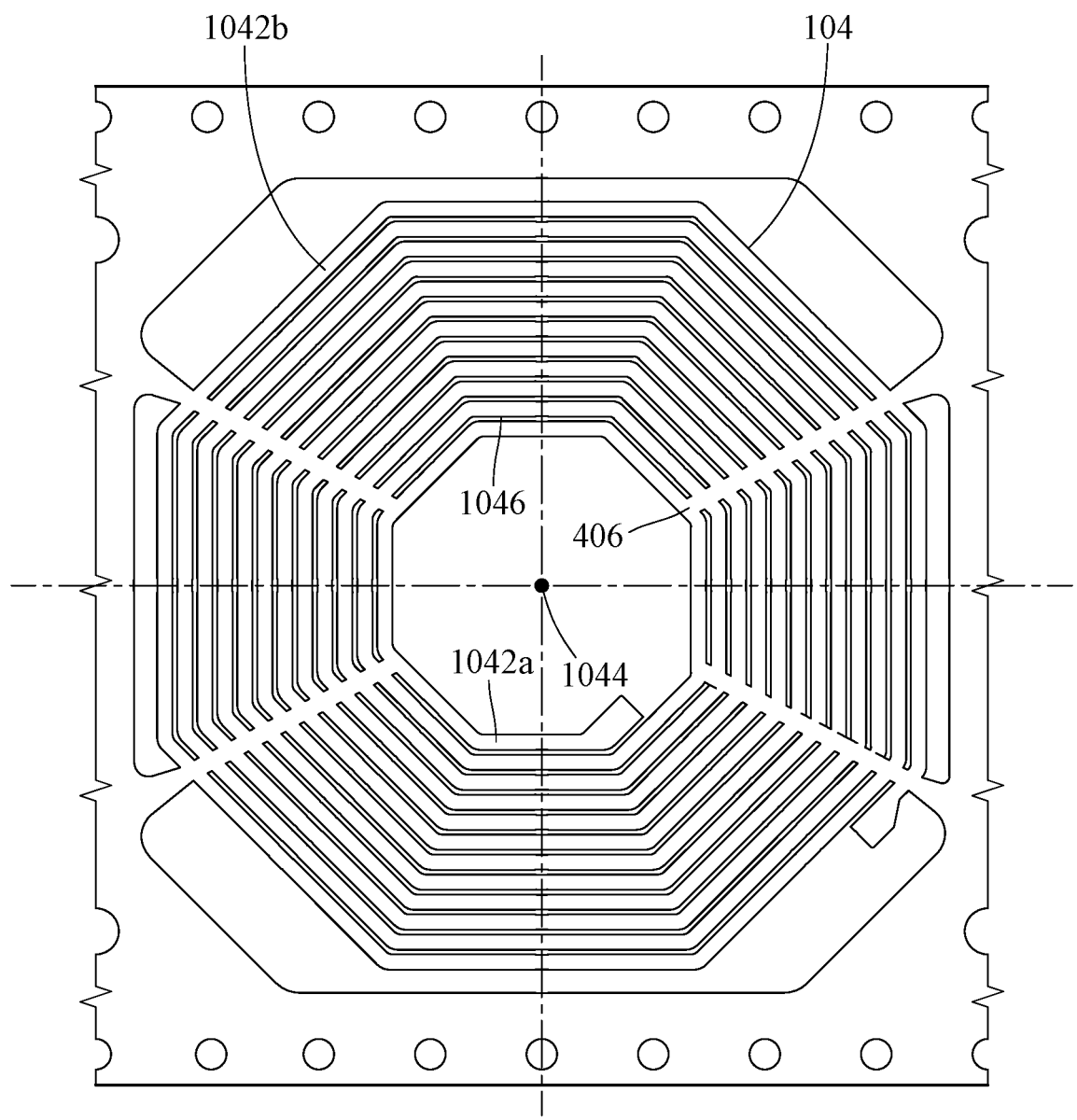
FIG. 7 is the floor plan which the coil structures connect to the fixing elements in the fourth embodiment of this present disclosure.

Please refer to FIG. 7. FIG. 7 is the floor plan which the coil structure is connected to the fixing elements in the fourth embodiment. As FIG. 7 shows, the major difference between the forth embodiment and the first embodiment shown in FIG. 1 is that the angles between the extended directions of any two fixing elements 406 next to each other are acute angles or obtuse angles in this embodiment.

Figure 8:
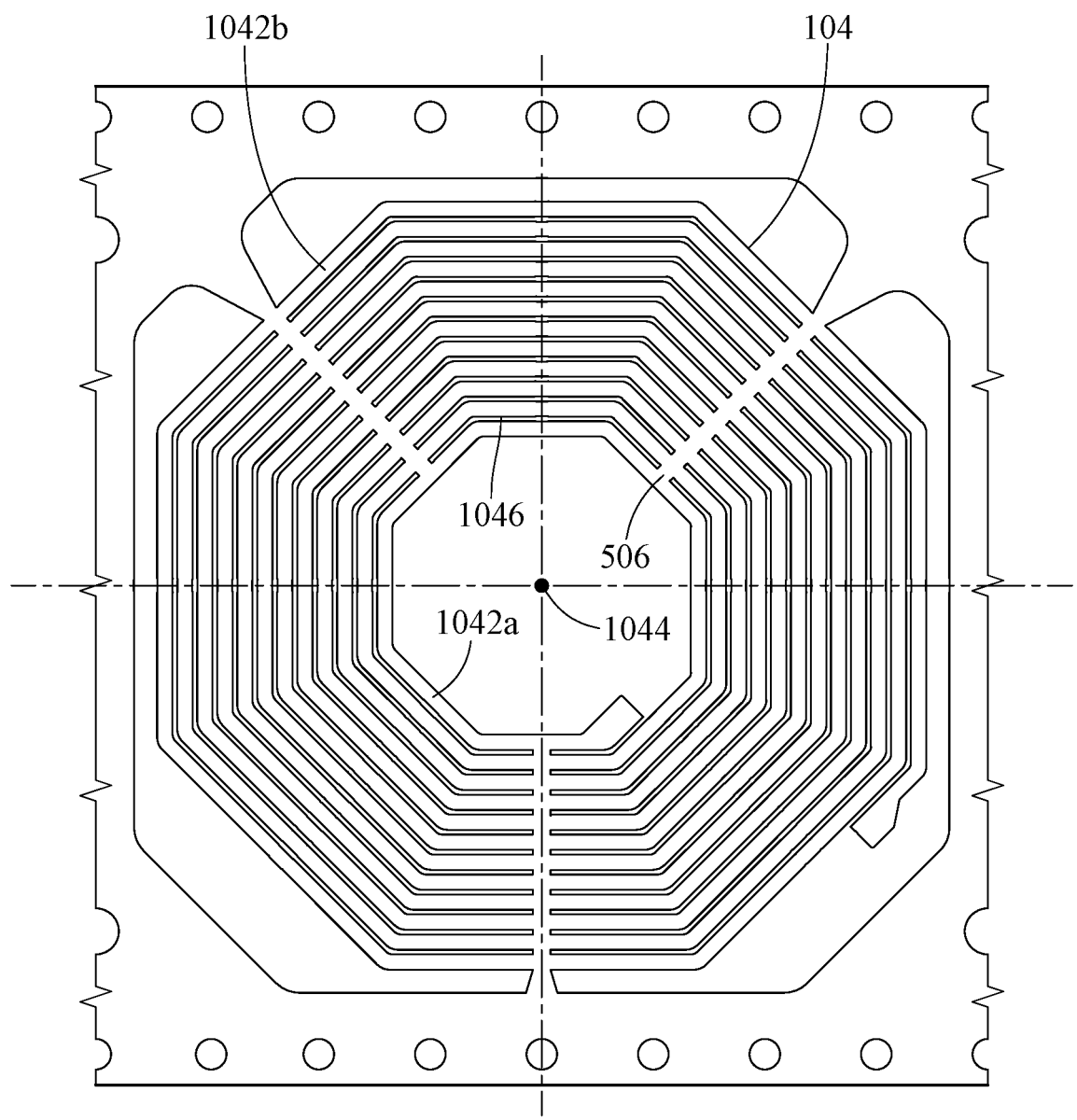
FIG. 8 is the floor plan which the coil structures connect to the fixing elements in the fifth embodiment of this present disclosure.

Please refer to FIG. 8. FIG. 8 is the floor plan which the coil structure connects to the fixing elements in the fifth embodiment. As FIG. 8 shows, the major difference between the forth embodiment and the first embodiment shown in FIG. 1 is that this embodiment comprises three fixing elements 506, wherein the angle is 90 degrees between the two extended directions which extend from the upper left fixing element 506 and the upper right fixing element 506. Also, the angle is 135 degrees between the two extended directions which extend from the bottom fixing element 506 and the upper left fixing element 506 or the upper right fixing element 506.

In other embodiments, the number of fixing element and the angle between the extended directions of any two fixing elements next to each other are able to be changed for different applications. For example, when there are three fixing elements, the angle is 120 degrees between the extended directions of any two fixing elements 506 next to each other. Additionally, if there are other kinds of odd number of the fixing elements, all the angles between the extended directions of any two fixing elements next to each other are the same.

Figure 9:
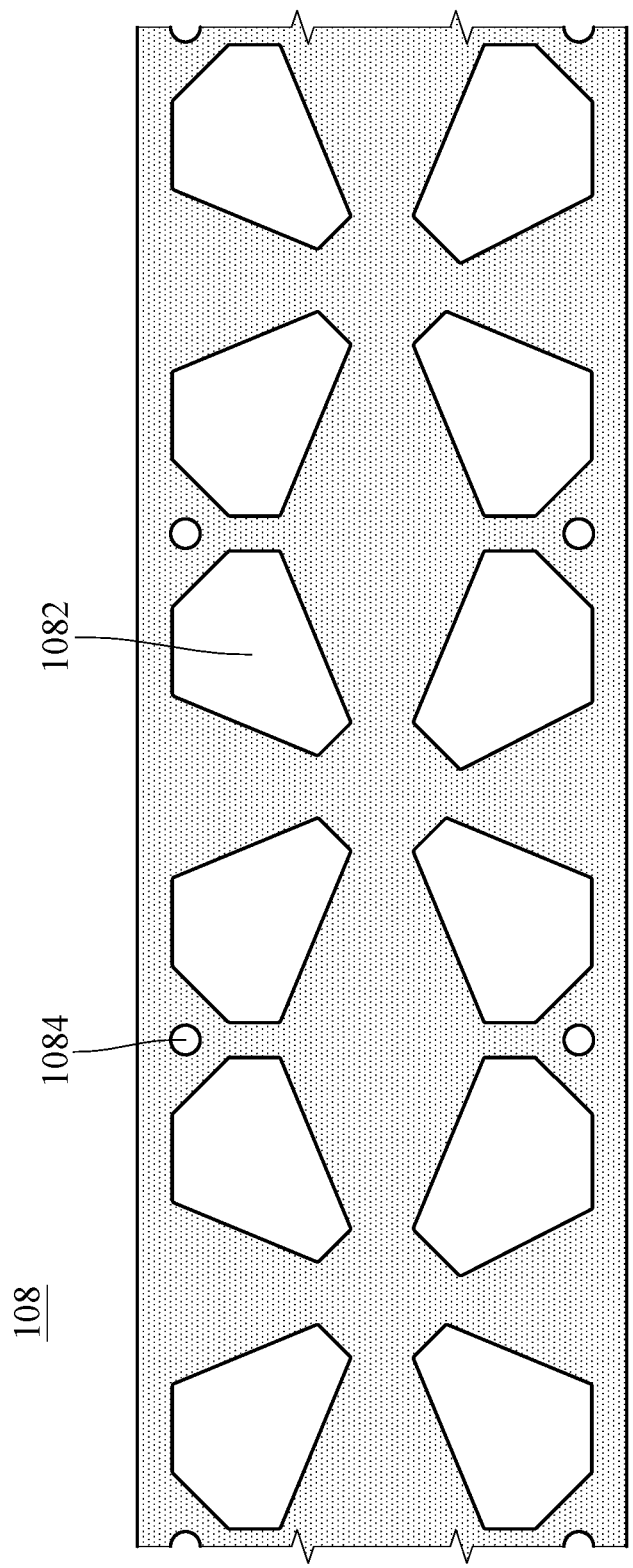
FIG. 9 is the floor plan of the transferring film in an embodiment of this present disclosure.
Figure 10:
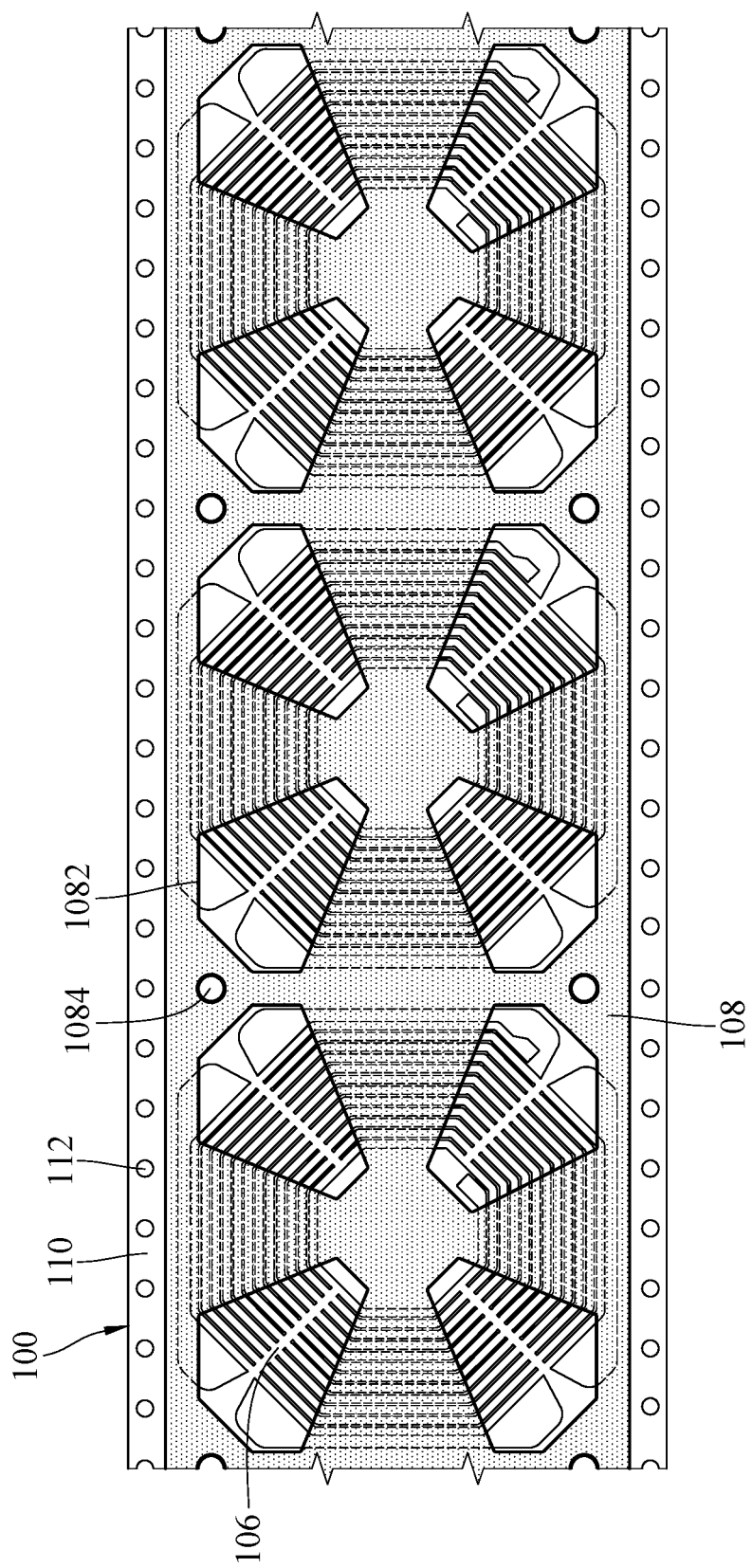
FIG. 10 is the floor plan of pasting transferring films on the coil structures in an embodiment of this present disclosure.

Please refer to FIG. 9 and FIG. 10. FIG. 9 is the floor plan of a transferring film 108 in an embodiment of this disclosure, and FIG. 10 is the floor plan of pasting the transferring films 105 on the coil structures 104 in an embodiment of this disclosure. As FIG. 9 and FIG. 10 show, there are a plurality of holes 1082 on the transferring film 108, and the shapes of the holes 1082 are corresponding to the position of the fixing element 106.

A strip 100 comprises a frame 110, and the frame 110 has a plurality of the first fixed position portions 112. On the transferring film 108, there are a plurality of the second fixed position portions 1084 corresponding to the first fixed position portions 112. When the transferring film 108 is pasted on a surface of the strip 100, the second fixed position portions 1084 of the transferring film 108 are aligned with the first fixed position portions 112 on the frames 110 of the strip 100. Hence, the holes 1082 disposed on the transferring film 108 are able to be aligned directly with the position of the fixing elements 106 for making the fixing elements 106 be exposed from the holes 1082 rather than connecting to the transferring film 108.

Figure 11:
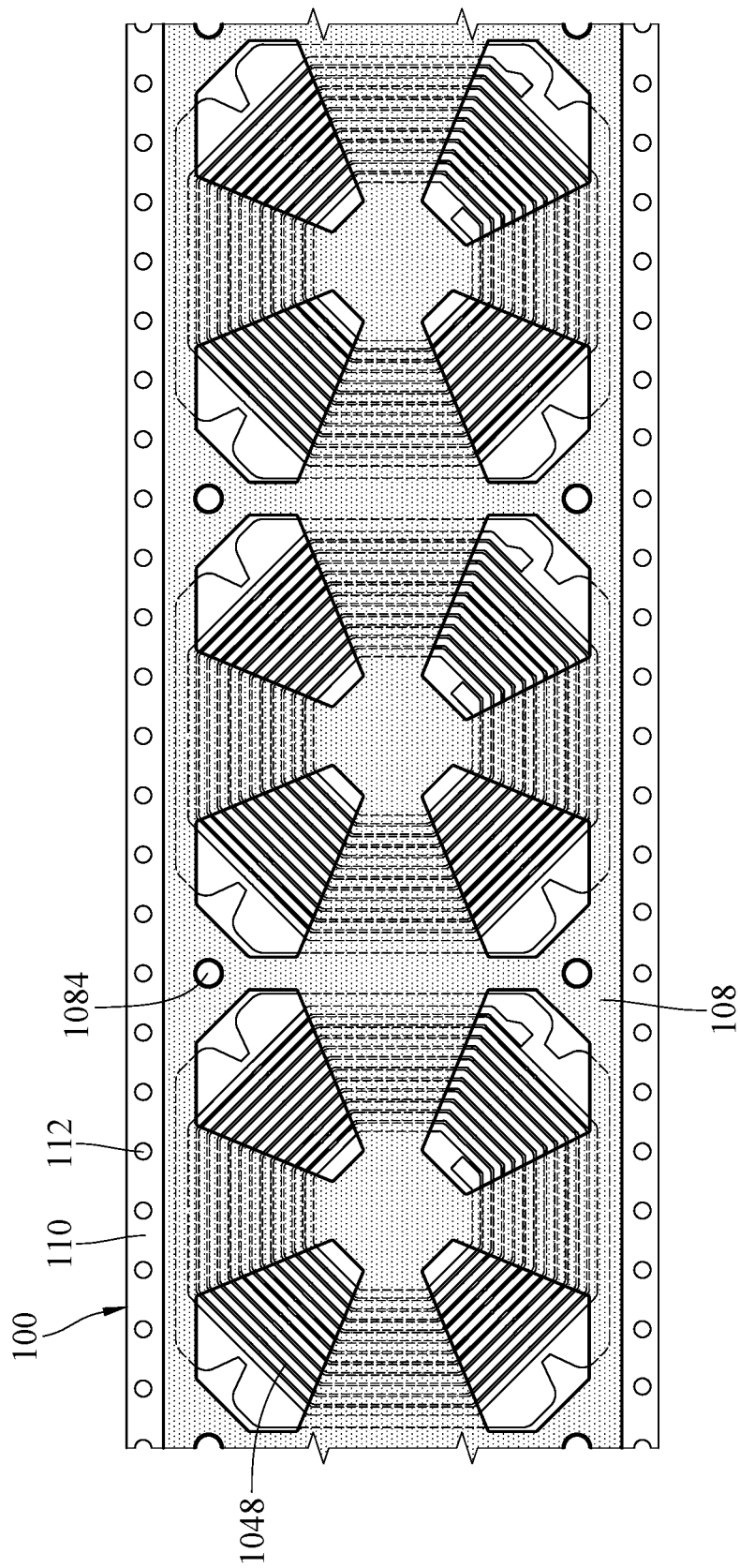
FIG. 11 is the floor plan of removing the fixing elements from the coil structures in an embodiment of this present disclosure.

Please refer to FIG. 11. FIG. 11 is the floor plan of removing the fixing elements from the coil structures ns an embodiment of this disclosure. As FIG. 11 shows, the transferring film 108 connects to any of two coil segments 1042 next to each other. Hence, even though the second punching process is performed to the strips 100, the width of the gap 1046 defined by any of two coil segments 1042 next to each other are able to be kept by the transferring film 108.

For testing the quality of the wireless charging coil, any of the meatal pieces 102 of the strip 100 is able to be cut from the strip 100 after the fixing elements 106 are removed from the strip 100. Therefore, a wireless charging coil module is able to be produced. Furthermore, the manufacture process for the wireless charging coil modulate comprises: supplying a flexible circuit board, and welding a side of the flexible circuit board to the surface of the coil structures 104, wherein the surface is not pasted by the transferring film 108, and another side of the flexible circuit board extends out of the metal piece 102 for connecting to the circuit board disposed in the portable electronic device. Also, a PE film is supplied and is connected to the second surface of coil structure 104, and the transferring film 108 is removed and is connected to a magnetic material (for example, a ferrite material) to the first surface 1046 of the coil structure 104. In addition, the glue on the transferring film 108 is common to be the weak glue, so the width of the gap 1048 is able to be kept when the transferring film 108 is removed.

Table 1 to Table 4 are the figures of "increase of the temperature" and "efficiency" under different power (5 W, 10 W, 12 W, 15 W) and the different manufactures for the wireless charging coils.

TABLE 1

| | | Watt | | | |
| --- | --- | --- | --- | --- | --- |
| | | 5 W | 5 W | 5 W | 5 W |
| | Minutes | 5 | 10 | 20 | 30 |
| This present disclosure | Coil temperature (Celsius) | 32 | 33 | 34 | 35 |
| | Increase of temperature (Celsius) | 7 | 8 | 9 | 10 |
| | Room temperature (Celsius) | 25 | 25 | 25 | 25 |
| | Efficiency | 81% | 81% | 81% | 81% |

TABLE 1-continued

| | | Watt | | | |
|---|---|---|---|---|---|
| | | 5 W | 5 W | 5 W | 5 W |
| | Minutes | 5 | 10 | 20 | 30 |
| First etching manufacture | Coil temperature (Celsius) | 35 | 36 | 37 | 37 |
| | Increase of temperature (Celsius) | 9 | 10 | 11 | 11 |
| | Room temperature (Celsius) | 26 | 26 | 26 | 26 |
| | Efficiency | 80% | 80% | 80% | 80% |
| Second etching manufacture | Coil temperature (Celsius) | 38 | 39 | 39 | 40 |
| | Increase of temperature (Celsius) | 12 | 13 | 13 | 14 |
| | Room temperature (Celsius) | 26 | 26 | 26 | 26 |
| | Efficiency | 74% | 74% | 74% | 74% |
| Third etching manufacture | Coil temperature (Celsius) | 35 | 35 | 36 | 36 |
| | Increase of temperature (Celsius) | 9 | 9 | 10 | 10 |
| | Room temperature (Celsius) | 26 | 26 | 26 | 26 |
| | Efficiency | 78% | 78% | 78% | 78% |

TABLE 2

| | | Watt | | | |
|---|---|---|---|---|---|
| | | 7.5 W | 7.5 W | 7.5 W | 7.5 W |
| | Minutes | 5 | 10 | 20 | 30 |
| This present disclosure | Coil temperature (Celsius) | 34 | 34 | 35 | 35 |
| | Increase of temperature (Celsius) | 8 | 8 | 9 | 9 |
| | Room temperature (Celsius) | 26 | 26 | 26 | 26 |
| | Efficiency | 85% | 85% | 85% | 85% |
| First etching manufacture | Coil temperature (Celsius) | 36 | 37 | 38 | 38 |
| | Increase of temperature (Celsius) | 10 | 11 | 12 | 12 |
| | Room temperature (Celsius) | 26 | 26 | 26 | 26 |
| | Efficiency | 84% | 84% | 84% | 84% |
| Second etching manufacture | Coil temperature (Celsius) | 40 | 42 | 42 | 43 |
| | Increase of temperature (Celsius) | 14 | 15 | 15 | 16 |
| | Room temperature (Celsius) | 26 | 27 | 27 | 27 |
| | Efficiency | 79% | 79% | 79% | 79% |
| Third etching manufacture | Coil temperature (Celsius) | 35 | 36 | 37 | 37 |
| | Increase of temperature (Celsius) | 9 | 10 | 11 | 11 |
| | Room temperature (Celsius) | 26 | 26 | 26 | 26 |
| | Efficiency | 82% | 82% | 82% | 82% |

TABLE 3

| | | Watt | | | |
|---|---|---|---|---|---|
| | | 10 W | 10 W | 10 W | 10 W |
| | Minutes | 5 | 10 | 20 | 30 |
| This present disclosure | Coil temperature (Celsius) | 35 | 36 | 37 | 37 |
| | Increase of temperature (Celsius) | 9 | 10 | 11 | 11 |
| | Room temperature (Celsius) | 26 | 26 | 26 | 26 |
| | Efficiency | 86% | 86% | 86% | 86% |
| First etching manufacture | Coil temperature (Celsius) | 37 | 39 | 40 | 40 |
| | Increase of temperature (Celsius) | 11 | 13 | 14 | 14 |
| | Room temperature (Celsius) | 26 | 26 | 26 | 26 |
| | Efficiency | 85% | 85% | 85% | 85% |
| Second etching manufacture | Coil temperature (Celsius) | 42 | 44 | 45 | 47 |
| | Increase of temperature (Celsius) | 15 | 18 | 19 | 20 |
| | Room temperature (Celsius) | 27 | 26 | 27 | 27 |
| | Efficiency | 83% | 83% | 83% | 83% |

TABLE 3-continued

| | | Watt | | | |
|---|---|---|---|---|---|
| | | 10 W | 10 W | 10 W | 10 W |
| | Minutes | 5 | 10 | 20 | 30 |
| Third etching manufacture | Coil temperature (Celsius) | 37 | 38 | 39 | 39 |
| | Increase of temperature (Celsius) | 11 | 12 | 13 | 13 |
| | Room temperature (Celsius) | 26 | 26 | 26 | 26 |
| | Efficiency | 83% | 83% | 83% | 83% |

TABLE 4

| | | Watt | | | |
|---|---|---|---|---|---|
| | | 15 W | 15 W | 15 W | 15 W |
| | Minutes | 5 | 10 | 20 | 30 |
| This present disclosure | Coil temperature (Celsius) | 39 | 40 | 42 | 42 |
| | Increase of temperature (Celsius) | 13 | 14 | 15 | 15 |
| | Room temperature (Celsius) | 26 | 26 | 27 | 27 |
| | Efficiency | 86% | 86% | 86% | 86% |
| First etching manufacture | Coil temperature (Celsius) | 42 | 45 | 46 | 47 |
| | Increase of temperature (Celsius) | 16 | 18 | 20 | 20 |
| | Room temperature (Celsius) | 26 | 27 | 26 | 27 |
| | Efficiency | 85% | 85% | 85% | 85% |

According to the figures listed from table 1 to table 4, as the efficiency the wireless charging coil received is a constant, we are able to compare the punching process or the manufacture method provided by this present disclosure to the first etching manufacture, the second etching manufacture and the third etching manufacture. As the above description, the efficiency is higher and the increase of the temperature between the room temperature and the surface temperature of the coil is lower in this present disclosure (i.e. when the wireless charging coils of the received end receives the same power, the transmitted power which the transmitted end required is relatively lower). On the other hand, when the power approaches to 15 W for the wireless charging coils produced by the second etching manufacture and the third etching manufacture, aforementioned wireless charging coils are not able to work since the surface temperature is too high.

As the above descriptions, because the fixing elements and the transferring film connect to the coil segments of the coil structures, even though the coil structures are produced by the strip, the width of the gaps defined by the coil segments of the coil structures are not able to be changed by the pulling stress. Moreover, the cost of the punching process for wireless charging coils is not only cheaper than the photo etching process, but also includes low electric consumption and less environmental pollution during the process. Furthermore, it does not need the substrates during the punched process, so the coil structures made by the punched process comprises much copper and preferable conductivity.

The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A punching process for manufacture of wireless charging coils, which comprising:

punching a metal piece for forming a coil structure and a fixing element;

wherein the coiling structure comprises a plurality of coil segments, a gap is defined by two of the plurality of coil segments next to each other, and the fixing element connects to the plurality of coil segments for keeping a width of the gap;

wherein the coil structure comprises a central position, two of the plurality of coil segments are a first coil segment and a second coil segment, the first coil segment served as an innermost coil segment is a closest one of the plurality of coil segments to the central position, the second coil segment served as an outermost coil segment is a farthest one of the plurality of coil segments to the central position, a part of the plurality of coil segments other than the first coil segment and the second coil segment are disposed between the first coil segment and the second coil segment, the fixing element further connects to all of the part of plurality of coil segments other than and disposed between the first coil segment and the second coil segment, and the fixing element extends straight from the innermost coil segment to the outermost coil segment, wherein punching the metal piece further comprises: forming another fixing element by the punching process, wherein the fixing element and the another fixing element extends in two extended directions respectively, and an angle between the two extended directions is 90 degrees.

2. The punching process for the wireless charging coils according to claim 1, wherein punching the metal piece further comprises: forming the coil structure and the fixing element by a plurality of continuous punching sections.

3. A manufacture method for wireless charging coils, which comprising:

performing a first punching process to a metal piece to form a punched metal piece, with the punched metal piece comprising a coil structure and a fixing element, the coil structure comprising a plurality of coil segments, two coil segments of the plurality of coil segments next to each other defining a first gap, and the first gap having an extended direction, wherein the fixing element connects to the two plurality of coil segments for keeping a width of the first gap defined by the two coil segments;

pasting a transferring film on the punched metal piece, wherein the transferring film connects to the two coil segments for keeping the width of the first gap defined by the two coil segments; and performing a second punching process to the punched metal piece pasted with the transferring film for removing parts of the fixing element corresponding to the extended direction of the first gap;

wherein the coil structure comprises a central position, the two of the plurality of coil segments are a first coil segment and a second coil segment, the first coil segment served as an innermost coil segment is a closest one of the plurality of coil segments to the central position, the second coil segment served as an outermost coil segment is a farthest one of the plurality of coil segments to the central position, a part of the plurality of coil segments other than the first coil segment and the second coil segment are disposed between the first coil segment and the second coil segment, the fixing element further connects to all of the part of plurality of coil segments other than and disposed between the first coil segment and the second coil segment, and the fixing element extends straight from the innermost coil segment to the outermost coil segment, wherein punching the metal piece further comprises: forming another fixing element by the punching process, and each of the fixing element and the another fixing element extends in two extended directions respectively, and an angle between the two extended directions is 90 degrees.

4. The manufacture method for the wireless charging coils according to claim 3, wherein performing the first punching process to the metal piece further comprises: forming the coil structure and each of the fixing elements by a plurality of continuous punching sections.

5. The manufacture method for the wireless charging coils according to claim 4, wherein there are a plurality of second gaps between the first coil segment and the second coil segment, each of the plurality of second gaps comprises an extended direction, and performing the second punching process for removing parts of the fixing element corresponding to the extended directions of the plurality of second gaps.

6. The manufacture method for the wireless charging coils according to claim 4, wherein the transferring film comprises a hole, and the fixing element is exposed from the hole and uncovered by the transferring film when the transferring film is pasted on the punched metal piece.

* * * * *